(12) United States Patent
Kim et al.

(10) Patent No.: US 9,225,041 B2
(45) Date of Patent: Dec. 29, 2015

(54) AUTOMOBILE BATTERY AND METHOD FOR MANUFACTURING POLE PLATES

(75) Inventors: Dae Ung Kim, Gwangju (KR); Kyu Hyeong Lee, Gwangju (KR); Sung Joon Kim, Gwangju (KR)

(73) Assignee: GLOBAL BATTERY CO., LTD., Seoul (KR)

( * ) Notice: Subject to any disclaimer, the term of this patent is extended or adjusted under 35 U.S.C. 154(b) by 391 days.

(21) Appl. No.: 13/820,507

(22) PCT Filed: Oct. 20, 2011

(86) PCT No.: PCT/KR2011/007844
§ 371 (c)(1),
(2), (4) Date: Mar. 2, 2013

(87) PCT Pub. No.: WO2012/064028
PCT Pub. Date: May 18, 2012

(65) Prior Publication Data
US 2013/0164575 A1    Jun. 27, 2013

(30) Foreign Application Priority Data

Nov. 8, 2010    (KR) ........................ 10-2010-0110184

(51) Int. Cl.
*H01M 2/08* (2006.01)
*H01M 2/12* (2006.01)
(Continued)

(52) U.S. Cl.
CPC ............ *H01M 10/14* (2013.01); *H01M 2/0242* (2013.01); *H01M 2/0262* (2013.01);
(Continued)

(58) Field of Classification Search
USPC .......................... 429/53–56, 61–64, 163–187; 29/623.1–623.5
See application file for complete search history.

(56) References Cited

U.S. PATENT DOCUMENTS 2,937,223 A * 5/1960 Thompson ...................... 429/89
3,853,626 A * 12/1974 Daniels et al. ...................... 29/2
(Continued)

FOREIGN PATENT DOCUMENTS

JP          11-233119 A     8/1999
JP          2001-202988 A   7/2001
(Continued)

OTHER PUBLICATIONS

International Search Report for PCT/KR2011/007844.

*Primary Examiner* — Basia Ridley
*Assistant Examiner* — Caitlin Wilmot
(74) *Attorney, Agent, or Firm* — The PL Law Group, PLLC

(57) ABSTRACT

A battery includes anode plates, formed as a mesh by forming cuts in series on a lead plate strip rolled into a uniform thickness, for storing electricity in a chemically reactive state by expansion processing, cathode plates formed as a mesh for storing electricity in a chemically reactive state, separators between the anode and cathode plates for electrical insulation, mechanical separation, and the impregnation of an AGM with electrolyte, such that the chemical reaction for storing electricity is facilitated and the pressure in the cell remains constant, upper and lower cases made of polypropylene and containing the anode plates, cathode plates, separators, and electrolyte in a plurality of mutually separate cells, and a cap coupled into the screw holes formed in the cell units in the upper case, for discharging gas generated during charge and discharge when the pressure of the gas is over a permissible level.

7 Claims, 8 Drawing Sheets

(51) Int. Cl.
*H01M 10/14* (2006.01)
*H01M 4/16* (2006.01)
*H01M 2/02* (2006.01)
*H01M 2/16* (2006.01)
*H01M 4/73* (2006.01)
*H01M 10/12* (2006.01)
*H01M 4/74* (2006.01)
*H01M 4/84* (2006.01)

(52) U.S. Cl.
CPC .......... *H01M2/0277* (2013.01); *H01M 2/1211* (2013.01); *H01M 2/1229* (2013.01); *H01M 2/1288* (2013.01); *H01M 2/1613* (2013.01); *H01M 4/16* (2013.01); *H01M 4/73* (2013.01); *H01M 4/745* (2013.01); *H01M 4/84* (2013.01); *H01M 10/121* (2013.01); *H01M 2220/20* (2013.01); *Y02E 60/126* (2013.01); *Y02P 70/54* (2015.11); *Y02T 10/7016* (2013.01); *Y10T 29/18* (2015.01)

(56) References Cited

U.S. PATENT DOCUMENTS

| | | | | |
|---|---|---|---|---|
| 4,250,232 | A | * | 2/1981 | Davidson ........................ 429/56 |
| 4,648,177 | A | * | 3/1987 | Uba et al. ..................... 29/623.2 |
| 2011/0003184 | A1 | * | 1/2011 | Koch .................. H01M 2/1229 429/53 |

FOREIGN PATENT DOCUMENTS

| | | |
|---|---|---|
| JP | 2003-346764 A | 12/2003 |
| KR | 10-0343111 B1 | 7/2002 |

* cited by examiner

AUTOMOBILE BATTERY AND METHOD FOR MANUFACTURING POLE PLATES

CROSS REFERENCE TO RELATED APPLICATIONS AND CLAIM OF PRIORITY

This patent application is a National Phase application under 35 U.S.C. §371 of International Application No. PCT/KR2011/007844, filed Oct. 20, 2011, which claims priority to Korean Patent Application No. 10-2010-0110184 filed Nov. 8, 2010, entire contents of which are incorporated herein by reference.

BACKGROUND

1. Technical Field

The present invention relates to an automobile battery and a method of manufacturing plates thereof.

2. Description of the Related Art

Batteries include secondary batteries or storage batteries (hereinafter, referred to as "batteries") which are reusable because a series of procedures of supplying the charged current via discharge, wherein voltage drop occurs during discharge, performing discharge until the inner voltage of the battery reaches the set lowest voltage, performing charge before the permissible lowest voltage, and re-supplying the current via discharge are repeated an allowed number of times.

Batteries are classified into a variety of kinds, depending on the materials used for the anode, cathode, and electrolyte (which indicates an electrolytic solution), and a battery wherein lead (Pb) is used for electrodes and sulfuric acid is used as an electrolyte is called a lead battery.

A lead battery having the present configuration was developed by Plant, in France in 1860, and is advantageous because the voltage is the highest among battery systems using a liquid electrolyte, a variety of current values are supplied in the relatively wide temperature range, and energy efficiency is high to the level of 80% or more. Furthermore, a lead battery has a longer lifespan, offers better storage performance, and has a lower price, and is recyclable and thus eco-friendly, compared to the other kinds of batteries. Hence, this battery has been steadily used for about 150 years, from the time it was developed to the present day.

Electrodes of the lead battery include plates and poles for anode and cathode, and respective plates are physically and electrically separated by separators, and are received or placed in a battery case along with the electrolyte.

The anode and cathode plates of the lead battery are composed mainly of lead and should have a predetermined thickness, and thus are regarded as considerably heavy elements.

Examples of such a lead battery include a vehicle battery made so as to be adapted for vehicles to handle conditions of extreme impact, vibration and tilt, and an industrial battery made so as to output a large current in a fixed place.

A lead battery operates based on a principle in which charge and discharge are repeated via a reversible reaction of, for example, $PbO_2 + H_2SO_4 \leftrightarrow PbSO_4 + 2H_2O$, and the produced electricity is discharged and output and the input electricity is charged and stored.

A lead battery utilizes a chemical action in which lead dioxide ($PbO_2$) used for the plates and sulfuric acid ($H_2SO_4$) used for the electrolyte are converted into lead sulfate ($PbSO_4$) and water ($H_2O$). Upon conversion into lead sulfate ($PbSO_4$) and water ($H_2O$), electricity is produced and discharged, and upon charge, the opposite substitution takes place, and these procedures are repeated.

Whenever such a chemical reaction progresses, heat is generated from the inside of the battery, whereby part of the electrolyte may evaporate and simultaneously a small amount of hydrogen gas is generated. To prevent explosion due to the gas, the produced gas should be exhausted to the outside of the battery.

Briefly, a lead battery generates hydrogen gas and heat during charge and discharge, and also, an electrolyte may evaporate by heat to generate gas, which is then exhausted so that explosion of the battery due to the gas is prevented.

The lead battery having a closed case includes a gas outlet, but the amount of the electrolyte is gradually decreased via exhaust of the gas and thus the electrolyte should be periodically supplemented.

Also, a vehicle battery is exposed to vibration and tilt generated during driving. As such, the electrolyte should be prevented from leaking via the gas outlet.

Compared to the other kinds of batteries, such a lead battery is problematic because of a lower energy density, which has become an obstacle to widening the range of application of such a battery or the end uses thereof For instance, lead batteries for electric vehicles (EVs), the future demand of which is expected to drastically increase, are capable of a maximum output of about 20 to 30 Wh/kg, which is known to be an energy density suitable for driving a distance of about 80 to 100 Km.

Electric vehicles using such conventional lead batteries have to be equipped with a large number of heavy lead batteries to increase the driving distance, and the fuel efficiency of vehicles may decrease due to the weight of lead batteries. Hence, much attention is paid to the development of light lead batteries having high energy density.

Conventional lead batteries have been mass produced because plates therefor are formed using a casting process.

Conventionally, plates are manufactured in such a manner that a lead solution is gravity fed into a cast mold having a negative pattern corresponding to a shape of a plate, cooled and removed from the mold. The metal structure of the plates formed using a gravity casting process is magnifiedly observed to the extent that its grain boundaries may appear.

The plates, which are manufactured using the conventional casting process, make it difficult to maintain the thickness thereof uniform, and thus grain boundaries of the metal structure are shown to be comparatively large.

However, as charge and discharge of the battery are repeated, the plates may corrode along the grain boundaries of the metal structure thereof When corrosion takes place at the grain boundaries having a large structure, the grain boundaries having a large structure are separated from the plates, making it difficult to maintain the shape of the plates, undesirably shortening the lifespan of the battery.

To partially solve problems of separation of the grain boundaries having a large structure due to corrosion, a precious metal such as silver (Ag), barium (Ba), etc., may be added to lead, thereby forming a small metal structure between the grain boundaries having a large structure, consequently increasing the binding force between the metal structures.

This improved technique is advantageous because corrosion resistance of the lead plates may be increased, thus prolonging the lifespan of the battery.

However, the manufacturing cost of the plates may be increased due to the use of precious metal, undesirably increasing the price of the lead battery.

Also, problems of the weight of the lead battery not being reduced due to the weight of the plates manufactured using the conventional casting process remain unsolved.

To decrease the weight of the lead battery, techniques for manufacturing plates having a grid or mesh shape, instead of heavy plates manufactured using the conventional casting process, have been developed.

FIG. 1 illustrates a plate cast by gravity feeding a lead solution into a cast mold according to a conventional technique, and FIG. 2 illustrates a plate formed using a gravity casting process according to another conventional technique.

As illustrated in FIG. 1, a lead solution is gravity fed into a cast mold having a negative pattern corresponding to a plate having a grid (mesh) shape, cooled for a predetermined period of time, and then removed from the mold.

In the case of using such a casting process, two plates may be simultaneously formed using a single cast mold to increase productivity.

The two cast mesh-shaped plates are cut and separated, and unnecessary portions are trimmed, thus completing individual plates.

FIG. 2 illustrates the mesh-shaped plate separated after a gravity casting process, wherein the grid shape is different However, such conventional techniques are problematic because a series of processes including gravity feeding the lead solution into a cast mold, and cooling and extracting it require a period of time of, for example, about 4 to 5 sec or longer, undesirably increasing the production cycle time.

Moreover, the gravity casting process does not make the structure of the plate dense, resulting in poor corrosion resistance, and ultimately making it difficult to solve problems in which the lifespan of the plate is short.

Korean Patent No. 10-0289221 issued on Feb. 16, 2001, wherein the above problems are partially solved, discloses a battery grid, a plate, and a lead-acid battery made using the grid and the plate.

In this improved conventional technique, the lead plate is cast, processed to have a plurality of cuts having a uniform size thereon, and expanded at a rate of about 100 to 150 feet per minute, thus reducing the weight of the plate.

However, this conventional technique is also problematic because the metal structure is not dense due to formation of the lead plate using a gravity casting process, undesirably causing poor corrosion resistance, a short lifespan of the battery, a complicated production process, and a long production time, resulting in increased manufacturing costs.

In addition, Korean Patent Application No. 10-2009-7019301 filed Sep. 15, 2009 discloses a cathode grid for a battery.

In such a conventional technique, the cast lead plate is punched, so that the size of the plate is made uniform and high productivity may be obtained, but the consumption of lead may increase due to the punched portions, undesirably increasing the manufacturing cost. Furthermore, because the lead plate is formed using a gravity casting process, the metal structure is not dense and thus poor corrosion resistance may be attained, and the expectable lifespan of the battery may decrease.

Therefore, there are needs to develop a lead battery having high applicability, making it very useful as the energy source for electric vehicles, wherein the total weight of the lead battery may be reduced, and corrosion resistance of the plates may increase, thus prolonging the lifespan of the battery, decreasing the manufacturing cost, and increasing the energy density.

Moreover, there are needs to develop techniques for preventing a decrease in the amount of the electrolyte due to gas exhaust, and preventing the corrosion of the plates due to external air.

SUMMARY

Therefore, the present invention has been made keeping in mind the above problems of lead batteries for vehicles occurring in the related art, and an aspect of the present invention is to provide an automobile battery and a method of manufacturing plates thereof, wherein a rolled lead plate may be processed to have cuts thereon and then expanded, thus obtaining plates.

Another aspect of the present invention is to provide an automobile battery and a method of manufacturing plates thereof, wherein a series of processes, including rolling a cast lead plate, forming cuts thereon, expanding the lead plate at its width, and cutting it to manufacture plates, may be continuously performed, thus enabling rapid mass production and increasing productivity.

Yet another aspect of the present invention is to provide an automobile battery and a method of manufacturing plates thereof, wherein AGM separators may be disposed between the plates, so that inner pressure of the battery may be maintained constant, the charge time may be rapidly improved, and the electrolyte does not flow.

Still another aspect of the present invention is to provide an automobile battery and a method of manufacturing plates thereof, wherein gas generated during charge and discharge of the battery may be exhausted to the outside of the battery when the pressure of the gas is over a predetermined level within a case of the battery, and thus the remaining gas which is not exhausted is recovered as the electrolyte and the plates do not corrode even upon exposure to external air.

In order to accomplish the above aspects, at least one embodiments of the present invention provides an automobile battery, which is a lead battery, including a plurality of anode plates, formed in a mesh shape by forming a plurality of cuts in series on a lead plate strip rolled to a uniform thickness and performing expansion processing, and for storing electricity in a chemically reactive state; a plurality of cathode plates having a size identical to the anode plates and being in a mesh shape for storing electricity in a chemically reactive state; a plurality of separators disposed between the anode plates and the cathode plates so that the anode plates and the cathode plates are electrically insulated and mechanically separated, and formed by impregnating an absorbent glass mat (AGM) with an electrolyte, such that a chemical reaction for storing electricity is facilitated and an inner pressure of a cell is maintained constant; an upper case and a lower case, made of polypropylene and including a plurality of separate unit cells, each of the unit cells including the anode plates, the cathode plates, the separators, and an electrolyte; and a cap screw-coupled into a screw hole formed in each of the unit cells of the upper case so as to exhaust a gas generated during charge and discharge when pressure of the gas is over a permissible level.

According to an embodiment of the present invention, the cathode plates are of any one type selected from among types of rolled expanded plates, typical expanded plates, and cast expanded plates.

The AGM may be provided between the anode plates and the cathode plates, may include a mat of glass fibers, and may be impregnated with the electrolyte so that pressure is applied to the anode plates and the cathode plates and the AGM is brought into close contact with the anode plates and the cathode plates, and thus the plates are supported so as not to move while facilitating contact with the electrolyte.

The rolled expanded plates may be formed via a series of processes, including continuously compressing a cast lead plate using a plurality of rollers to produce a lead plate strip having a uniform width and thickness, forming cuts in series thereon, gradually drawing both sides of the strip having the cuts in a width direction so that a width of the strip is increased by 2.5 to 4 times, and cutting the strip to a predetermined size.

The lead plate may be cast to a thickness of 8 to 11 mm and a width of 90 to 110 mm, the lead plate may be compressed to be thinly rolled to a thickness corresponding to 1/9 to 1/12 of the initial thickness, the cuts may be formed to a size of 8 to 11 mm at an interval of 5 to 10 mm, and the strip may be expanded so that the width thereof is increased by 2.5 to 4 times.

Also, the cap may include an outer cap, screw-coupled into the screw hole formed in each of the unit cells of the upper case, and including a fixed cavity having one closed end at a central portion thereof, an exhaust passage connected to the closed end of the fixed cavity so as to communicate with outside, and a fixed fin and a pressure protrusion, which protrude in a form of a cone at a center of the closed end of the fixed cavity; an inner cap, inserted into the other open end of the fixed cavity of the outer cap and fastened by virtue of a fastening lock, and including a gas hole having both open ends at a center thereof; and a valve, provided between the outer cap and the inner cap, and including a hinge membrane fixed to one end of the inner cap by means of the fixed fin, a pressure part connected to the hinge membrane and being in contact with the pressure protrusion so as to support a predetermined pressure and to block one open end of the gas hole, and a blockage membrane connected to the hinge membrane and the pressure part and configured such that one end of the gas hole is blocked and the blocked end of the gas hole is opened when the pressure part is not supported by pressure more than a permissible level.

As such, the predetermined pressure may fall in the range of 80 to 160 mbar.

In addition, the present invention provides a method of manufacturing plates for an automobile battery which is a lead battery, including continuously casting a lead plate strip having a thickness of 8 to 11 mm and a width of 90 to 110 mm using a casting process in which a lead solution is fed into a cast mold; subjecting the cast lead plate strip to 7 to 10 rolling operations using a rolling part having rollers, thus obtaining a lead plate strip thinly rolled to a thickness corresponding to 1/9 to 1/12 of the initial thickness; forming cuts having a size of 8 to 11 mm in series on the flat surface of the rolled lead plate strip at an interval of 5 to 10 mm using a cut-forming part; continuously expanding both sides of the lead plate strip having the cuts using an expansion part so that a width of the lead plate strip is increased by 2.5 to 4 times; and cutting the expanded lead plate strip to a size of a plate for the battery using a cutting part.

Preferably, the continuously expanding is performed by gradually drawing the both sides of the lead plate strip along a length of 10 to 20 m so that the width thereof is expanded.

Accordingly, the present invention is industrially applicable because plates are manufactured in a mesh shape using rolling and expanding, thus increasing corrosion resistance, thereby reducing the weight of a lead battery and prolonging the lifespan thereof Also, the present invention is industrially applicable because a cast lead plate is subjected to a series of processes including rolling, formation of cuts, expansion, and cutting to produce plates, thus increasing productivity, thereby enabling mass production and decreasing the manufacturing cost.

Also, the present invention is easy to use because AGM separators are disposed between the plates, thus maintaining the inner pressure of the battery constant, rapidly improving the charge time, increasing reliability of output voltage, and preventing flow of an electrolyte, thereby improving properties under impact, vibration and tilt conditions.

Also, the present invention is easy to use because gas generated during charge and discharge is exhausted when the pressure of the gas is over a predetermined level in a battery case, and thus the gas which is not exhausted is recovered as the electrolyte, so that the level of the electrolyte is maintained uniform and the unnecessary inflow of external air is blocked, thus preventing corrosion of the plates and increasing the lifespan thereof, thereby satisfying the expectable lifespan of a lead battery.

DETAILED DESCRIPTION

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept implied by the term to best describe the method he or she knows for carrying out the invention. It is noted that, when known techniques related with the present invention may make the gist of the present invention unclear, a detailed description thereof will be omitted.

As used herein, the term "ISG (Idling Stop & Go)" is referred to as a system which enables an internal engine to be turned off when a vehicle is stopped, and to be turned on when a vehicle is started.

As used herein, the term "pressure" is used as having the same meaning as the pressure produced while the plates and the separators come into close contact with each other in the battery.

As used herein, the term "cap" is understood to be configured such that the gas generated in a battery is exhausted in a state in which the hole formed in the top of the battery is blocked, and an electrolyte may be supplemented via the opened cap while the level of the electrolyte is checked.

As used herein, the term "AGM (Absorbent Glass Mat)" indicates a cotton-like mat made of glass fibers.

As used herein, the term "strip" indicates a metal sheet in the form of a band.

As used herein, the term "depth of discharge (DOD)" indicates a depth of allowed power compared to a rated capacity at which a battery may be charged or discharged. In an exemplary embodiment, DOD 20% means discharge up to 20% of the rated charge/discharge capacity.

That is, DOD 20% in a battery having a capacity of 70 A means that the battery is discharged until the capacity is to be 56 A.

As used herein, the term "end" in the end voltage, end capacity, etc., indicate a state in which the battery cannot be further used, and this value may vary depending on the kind of battery.

Figure 1:
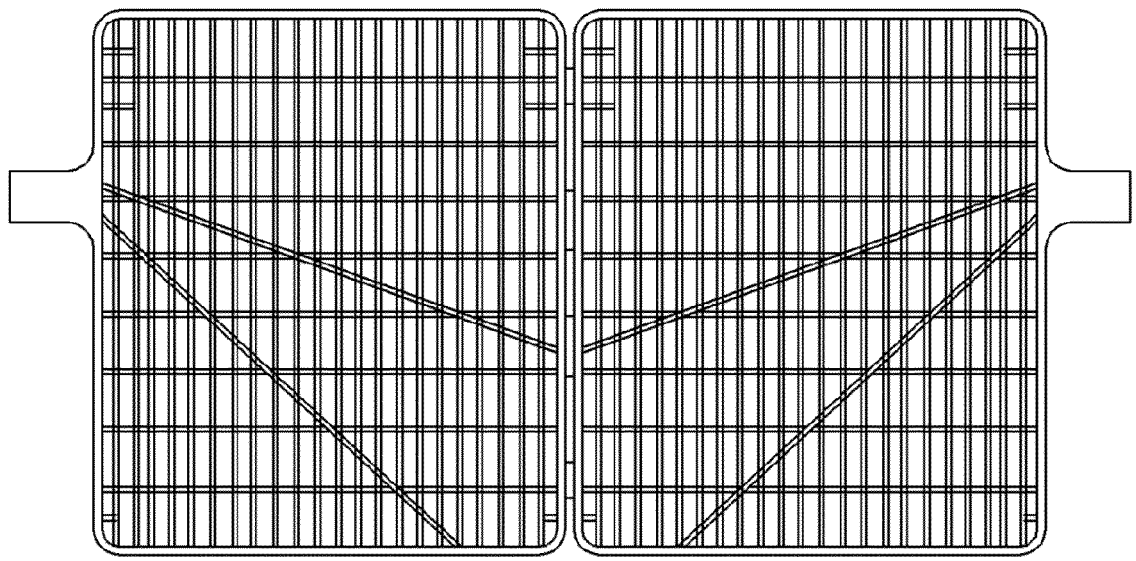
FIG. 1 is a view illustrating a plate cast by gravity feeding a lead solution into a cast mold according to a conventional technique.
Figure 2:
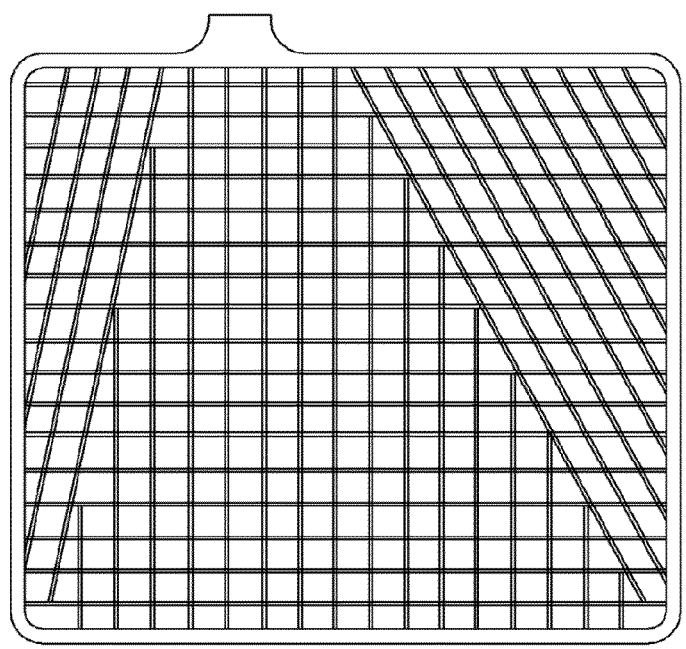
FIG. 2 is a view illustrating a plate formed using a gravity casting process according to another conventional technique.
Figure 3:
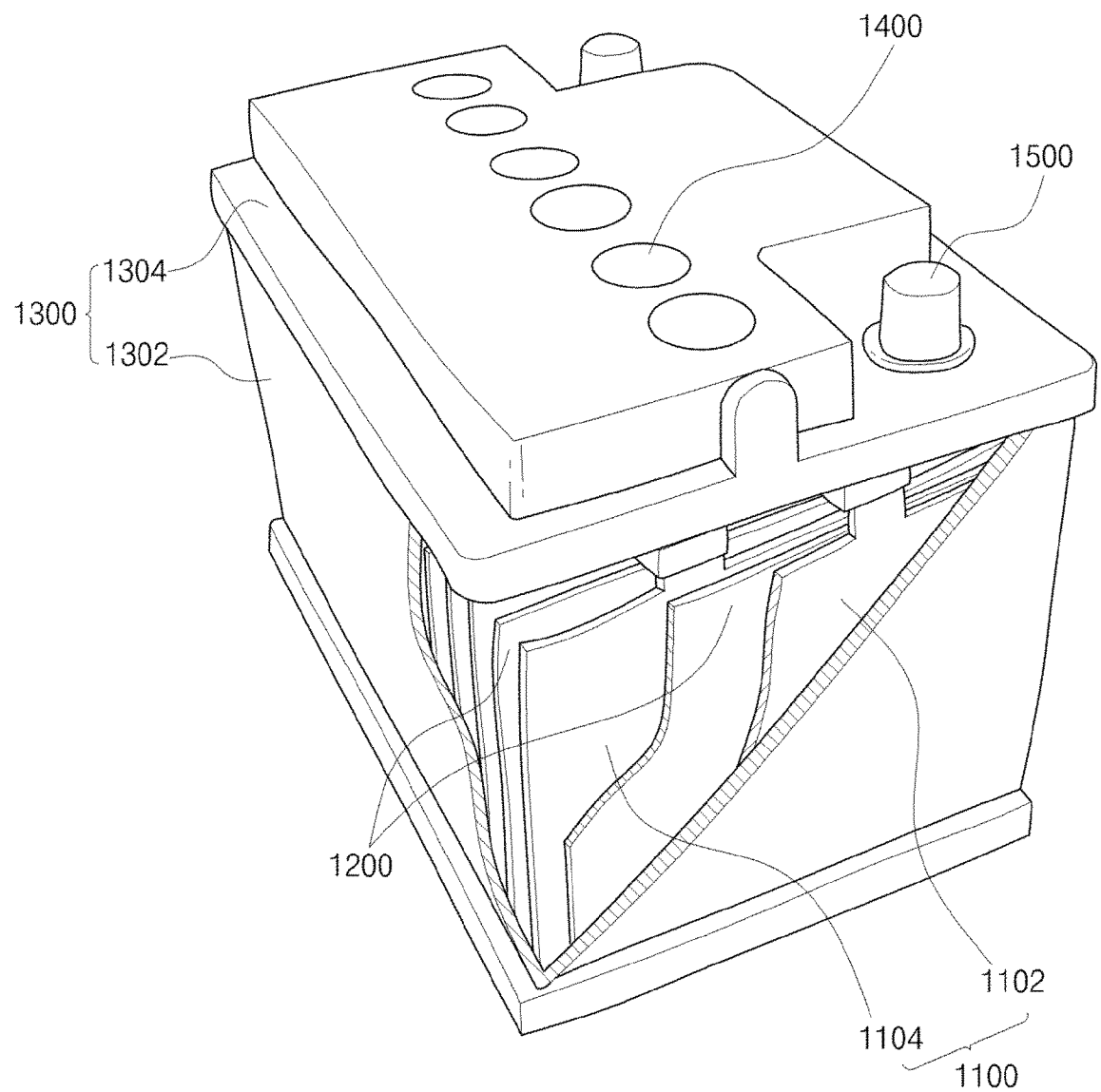
FIG. 3 is a partial cutaway view illustrating a lead battery according to an embodiment of the present invention.

FIG. 3 is a partial cutaway view illustrating a lead battery according to an embodiment of the present invention.

When specifically described below with reference to the appended drawing, a lead battery 1000 includes a plurality of anode plates 1102, a plurality of cathode plates 1104, a plurality of separators 1200, a lower case 1302, an upper case 1304, caps 1400, and terminals 1500.

As such, the anode plates 1102 and the cathode plates 1104 together are included in plates 1100.

The anode plates 1102, which are rolled expanded plates, are composed mainly of lead and are in a mesh (grid) shape so as to store electricity in a chemically reactive state.

The anode plates 1102 are formed by subjecting a lead plate strip having a thickness of 8 to 11 mm and a width of 90 to 110 mm via continuous casting to 7 to 10 continuous rolling operations using a roll mold, thus producing a thin rolled lead plate strip having a thickness corresponding to 1/6 to 1/12 of the initial thickness.

Subsequently, a plurality of cuts having a size of 8 to 11 mm is formed in series at up, down, left and right intervals of 5 to 10 mm on the flat surface of the thin rolled lead plate strip.

Subsequently, both sides of the lead plate strip having the cuts are continuously drawn to be slightly wider along the length of 10 to 20 m, so that the width thereof is increased by 2.5 to 4 times, thus forming a mesh shape.

The lead plate strip having a mesh shape is cut to a size suitable for being placed in the lower case (which is also referred to as a battery jar) of the battery, thereby obtaining rolled expanded plates.

The plates may be coated with an active material which facilitates a chemical reaction for storing electricity, and may then be dried.

Such rolled expanded plates do not easily corrode because the grain boundary structure of the metal is dense and corrosion resistance is good. Also, the lifespan of the plates may be prolonged owing to corrosion resistance, advantageously obtaining a satisfactory expectable lifespan of the battery.

Figure 10:
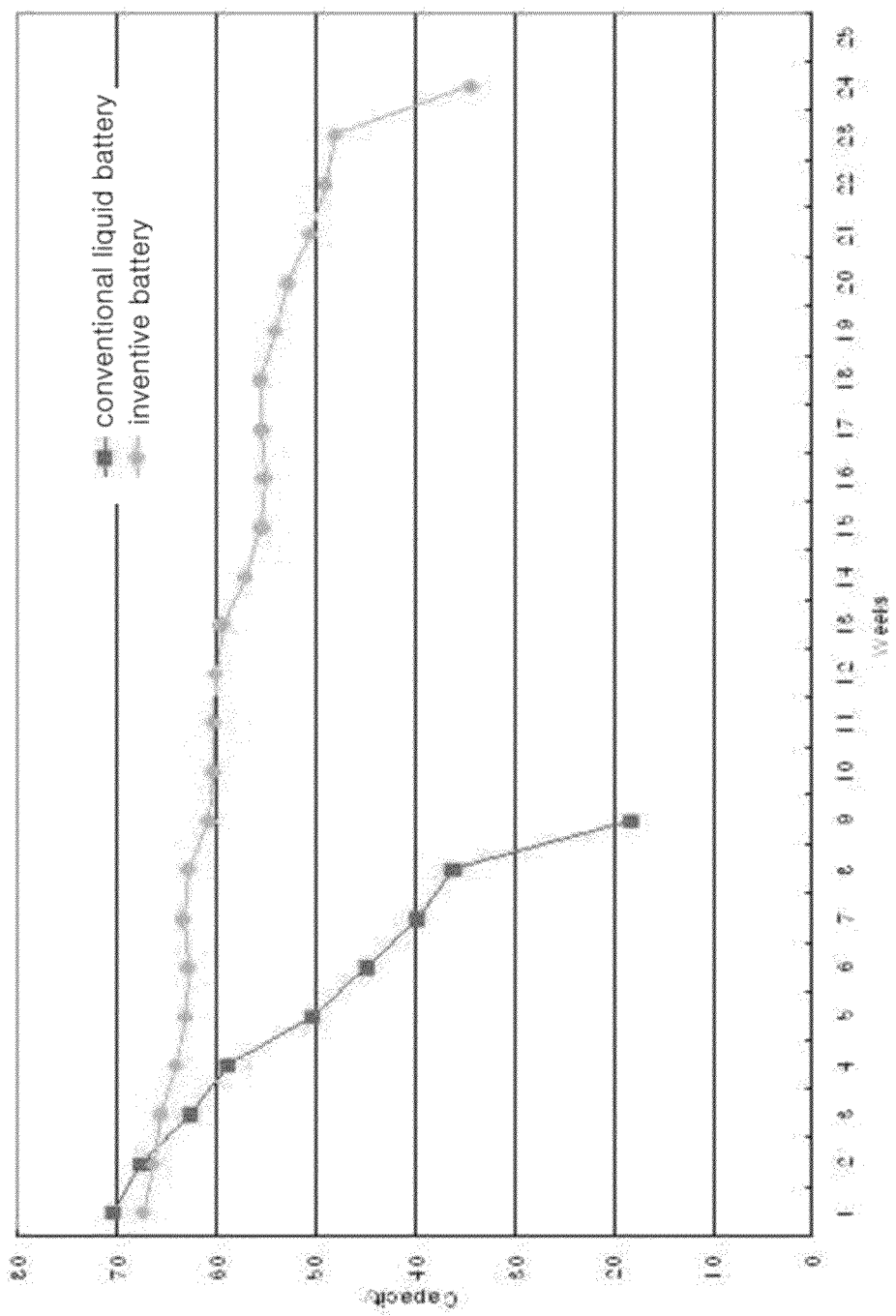
FIG. 10 is a graph illustrating the capacity of a battery using the plates according to the embodiment of the present invention, upon cycle testing at a depth of discharge of 17.5%.
Figure 11:
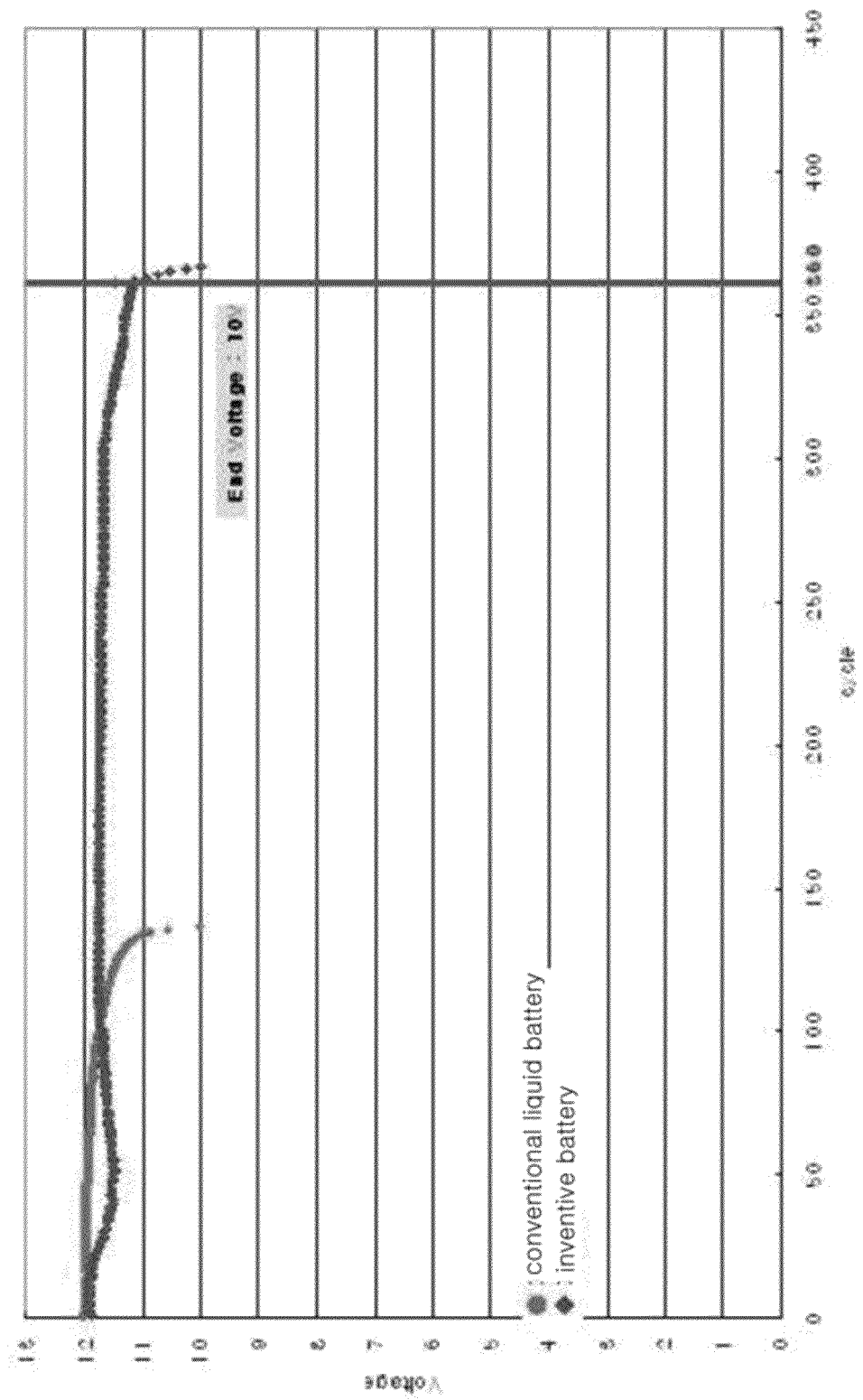
FIG. 11 is a graph illustrating the end voltage of the battery using the plates according to the embodiment of the present invention depending on the number of cycles, upon cycle testing at a depth of discharge of 50%.

In particular, compared to when using plates resulting from conventional casting techniques, the expectable lifespan of the battery according to an embodiment of the present invention may increase by about three times. With reference to FIGS. 10 and 11, an increase in the expectable lifespan is specified later.

Also, the plates are of an expanded type and thus are lightweight, and have high productivity. For example, about 10 to 20 plates may be produced per second.

The productivity of the rolled expanded plates according to an embodiment of the present invention is confirmed to be increased by about 10 times or more, compared to that of conventionally cast plates.

In an exemplary embodiment, the weight of the battery according to an embodiment of the present invention is confirmed to be decreased by about 10% or more, compared to the weight of a lead battery having conventional plates and a liquid electrolyte.

Also, the rolled expanded plates do not use a precious metal such as silver (Ag), barium (Ba), etc., to increase corrosion resistance, thus decreasing the manufacturing cost The cathode plates 1104 may be of any one type selected from among types of rolled expanded plates, typical expanded plates, and cast expanded plates, and have the same thickness and mesh shape as in the anode plates, and store electricity in a chemically reactive state.

The configuration and the manufacturing process of rolled expanded plates are the same as those used for the anode plates, and a description thereof is omitted.

Typical expanded plates are different in terms of using a lead strip cast in a gravity manner to attain a final thickness.

Forming the cuts, and performing expansion and cutting, are the same as in the manufacturing process of the rolled expanded plates for the anode plates, and a description thereof is omitted.

The typical expanded plates using the lead plate strip cast without rolling are advantageous because high productivity may be obtained and the weight of the lead battery may be decreased, as in the rolled expanded plates.

Cast plates are weak to corrosion because the grain boundary structure of metal is not dense, and it is difficult to maintain the shape of the plates due to corrosion upon extended use, and thus the expectable lifespan of the battery is not prolonged.

However, because the cathode plates 1104 are less active than the anode plates 1102, typical expanded plates may be applied.

The cast expanded plates are obtained by forming a negative pattern corresponding to a plate having a mesh shape in a cast mold, and gravity feeding a lead solution into the mold, thus forming or imprinting plates.

As in the typical expanded plates, the cast expanded plates are weak to corrosion because the grain boundary structure of metal is not dense, and the shape of the plates is difficult to maintain due to corrosion upon extended use, making it impossible to prolong the expectable lifespan of the battery.

The reason why the cast expanded plates may be applied to the cathode plates 1104 is that the cathode plates are less active than the anode plates 1102.

However, the use of the mold is disadvantageous in terms of low productivity due to a long cycle time, because post-processing including cutting, etc., is required after formation of two plates at a time.

The separators 1200 are disposed between the anode plates 1102 and the cathode plates 1104 so that the anode and cathode plates are electrically insulated and mechanically separated, and are made of AGM as a glass fiber mat and thus may swell like cotton so that pressure is applied to the plates and the plates are supported so as not to move. Furthermore, the separators have cushioning ability and thus enable the plates to be buffered and to endure, even when an external impact, vibration or tilt occurs.

Moreover, glass fibers of AGM are impregnated with the liquid electrolyte so that the electrolyte does not flow, and thus the electrolyte has no flowability. Furthermore, a chemical reaction with the plates may become efficient even in the presence of a small amount of the electrolyte, and the weight of the battery may be decreased.

The separators 1200 are configured such that the glass fiber mat impregnated with the electrolyte is brought into close contact with the plates 1100 so as to generate pressure, and thus a chemical reaction is rapidly carried out even in the presence of a small amount of the electrolyte, thus improving the charge rate and ensuring the reliability of the output voltage.

The AGM separators according to an embodiment of the present invention generate a pressure of about 20 kPa.

As such, 1 kPa equals to 0.0102 kgf/cm, and thus 20 kPa equals to 0.204 kgf/cm, which means that a force of 0.204 kg per cubic centimeter is applied.

In the battery, a force of 0.204 kg per cubic centimeter is applied to the plates by virtue of the AGM separators 1200 according to an embodiment of the present invention.

In an exemplary embodiment, in the case where the AGM separators impregnated with the electrolyte are used, compared to when using conventional separators and liquid electrolyte, the amount of the electrolyte may be decreased, and thus the weight of the battery may be lowered by about 3.4% and the charge rate may be improved by about 4 times, making it possible to rapidly perform charge for a short period of time.

Table 1 below shows the weight of batteries when using the conventional AGM separators and the AGM separators according to an embodiment of the present invention.

TABLE 1

|  | Inventive | Conventional |
| --- | --- | --- |
| Size (L * W * H) mm | 278 * 175 * 190 | 278 * 175 * 190 |
| Capacity | 70 AH/20 HR | 70 AH/20 HR |
| −18° C. CCA | 760 A | 760 A |
| Weight (Kg) | 19.8 Kg | 20.5 Kg |

As is apparent from Table 1, in the case where the battery according to an embodiment of the present invention and the conventional battery are set to have the same performance, the weight of the battery according to an embodiment of the present invention is lower by 700 g, corresponding to 3.4%.

In batteries having a width, a length, and a height of 278 mm, 175 mm, and 190 mm, a capacity of 70 AH/20HR and CCA (Cold Cranking Ampere) of 760 A at −18° C., the conventional battery has a weight of 20.5 Kg, and the battery according to an embodiment of the present invention has a weight of 19.8 Kg.

As such, CCA rating is defined as the current the battery at −18° C. can deliver for 30 seconds and maintain at least 7.2 V under a high current of 760 A for 30 sec.

Briefly, the weight of the battery according to an embodiment of the present invention is decreased by 3.4% under the conditions of having the same size, capacity and performance as the batteries.

The lower case 1302 and the upper case 1304 are formed of polypropylene (PP) using an injection mold, and include a plurality of unit cells, each including the anode plates 1102, the cathode plates 1104, the separators 1200, and the electrolyte.

The lower case 1302 is referred to as a battery jar, and, in an embodiment of the present invention, the lower case 1302 and the upper case 1304 together are included in a case 1300.

The upper case 1304 includes an anode terminal 1500 to which all of the anodes 1102 of the lead battery 1000 are connected, a cathode terminal 1500 to which all of the cathodes 1104 are connected, and screw holes communicating with respective unit cells at the positions of the corresponding cells.

The caps 1400 are respectively screw-coupled into the screw holes of the unit cells of the upper case 1304 and enable gas generated from the inside of the battery due to charge and discharge to be exhausted to the outside of the case 1300 when the pressure of the gas is over a predetermined level.

Figure 4:
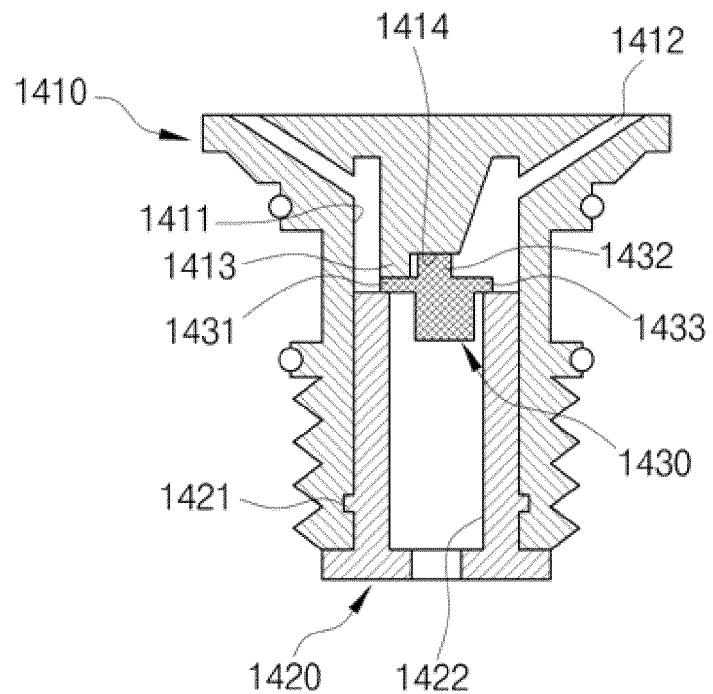
FIGS. 4 and 5 are cross-sectional views illustrating a cap according to an embodiment of the present invention.
Figure 5:
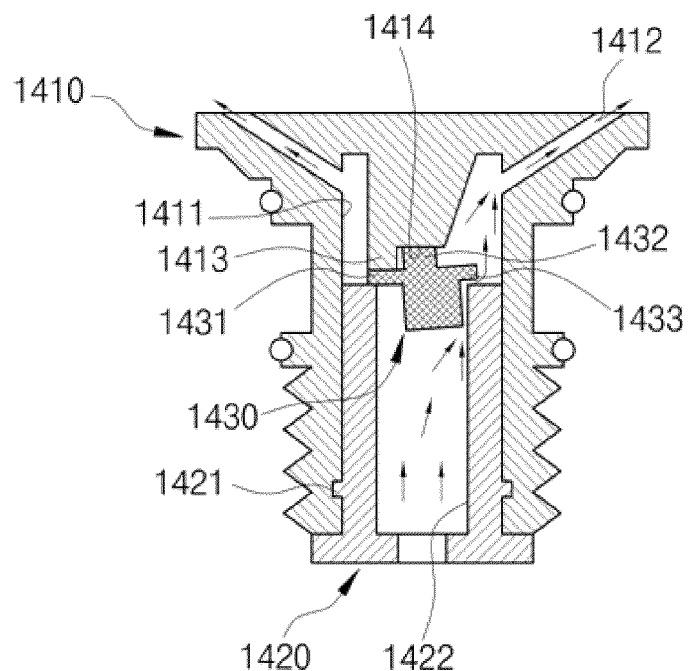

FIGS. 4 and 5 are cross-sectional views illustrating the cap according to an embodiment of the present invention.

When specifically described below with reference to the appended drawings, the cap 1400 includes an outer cap 1410, an inner cap 1420, and a valve 1430.

The outer cap 1410 is screw-coupled into the screw hole formed in each of the unit cells of the upper case 1304, and includes a fixed cavity 1411 having one closed end at the central portion thereof, an exhaust passage 1412 connected to the closed end of the fixed cavity 1411 so as to communicate with the outside, and a fixed fin 1413 and a pressure protrusion 1414, which protrude in the form of a cone at the center of the closed end of the fixed cavity 1411.

The inner cap 1420 is inserted into the other open end of the fixed cavity 1411 of the outer cap 1410 and is fastened into the fixed cavity 1411 by virtue of a fastening lock 1421, and includes a gas hole 1422 having both open ends at the center thereof The valve 1430 is provided between the outer cap 1410 and the inner cap 1420, and includes a hinge membrane 1431 fixed to one end of the inner cap 1420 by means of the fixed fin 1413, a pressure part 1432 connected to the hinge membrane 1431 and being in contact with the pressure protrusion 1414 so as to support pressure based on atmospheric pressure at a predetermined level generated by the gas and to block one open end of the gas hole 1422, and a blockage membrane 1433 connected to the hinge membrane 1431 and the pressure part 1432 and configured such that one end of the gas hole 1422 is blocked and the blocked end of the gas hole 1422 is opened when the pressure part 1432 is not supported by the pressure more than a permissible level.

FIG. 4 illustrates a state in which the gas hole 1422 is blocked by the valve 1430 when the pressure of the produced gas is atmospheric pressure at or below a permissible level, and FIG. 5 illustrates a state in which the gas is exhausted in the direction of arrow by opening the gas hole by the blockage membrane 1433 while changing the form of the pressure part 1432 when the pressure of the gas is over a permissible level.

The lead battery 1000 generates hydrogen gas and heat via charge and discharge, and heat evaporates the electrolyte, thus producing an electrolyte gas.

That is, when the generated hydrogen gas and the gas resulting from evaporation of the electrolyte accumulate, pressure (atmospheric pressure) may increase, undesirably exploding the case 1300.

Accordingly, the case 1300 is typically provided with a gas outlet through which the gas is naturally exhausted. As the gas resulting from evaporating the electrolyte is exhausted, however, the amount of the electrolyte is decreased and thus the electrolyte or distilled water should be periodically supplemented.

As such, when gas resulting from evaporating an electrolyte is blocked so as not to be exhausted, the evaporated gas is cooled and may thus be recovered again as the electrolyte, whereby a decrement in the electrolyte may be considerably lowered, which is a general concept of a maintenance-free battery.

Hence, in an embodiment of the present invention, the lead battery 1000 is configured such that the exhaust of gas generated during charge and discharge is maximally blocked so as not to decrease the amount of the electrolyte.

When the pressure of the generated gas is over a permissible level, the gas is exhausted so as to prevent the explosion of the case 1300, which is incorporated in the scope of the invention.

The permissible pressure (atmospheric pressure) falls in the range of 80 to 160 mbar.

Each of the unit cells of the battery 1000 according to an embodiment of the present invention includes the anode plates 1102, the cathode plates 1104, and the AGM separators 1200 impregnated with the electrolyte, and generates gas via charge and discharge.

The gas generated from each of the cells of the lead battery 1000 is fed into the gas hole 1422 of the cap 1400 screw-coupled into the screw hole and is not exhausted but is blocked by virtue of the valve.

With the inner cap 1420 of the cap 1400 being inserted into the fixed cavity 1411 of the outer cap 1410, the fastening lock 1421 is fastened by being inserted into the groove having a complementary shape at the corresponding position of the fixed cavity 1411.

The valve 1430 is provided between the inner cap 1420 and the outer cap 1420 which are fastened, and the hinge membrane 1431 of the valve 1430 is fixed to one end of the inner cap 1420 by means of the fixed fin 1413. The pressure part 1432 opens the blockage membrane 1433 when the pressure (atmospheric pressure) over a permissible level is formed.

In the case where the blockage membrane 1433 fixed by the hinge membrane 1431 is opened, the gas hole 1422, the fixed cavity 1411, and the exhaust passage 1412 are connected so as to communicate with each other.

Therefore, the gas generated from the inside of the lead battery 1000 is exhausted to the outside of the case 1300 via the gas hole 1422, the fixed cavity 1411, and the exhaust passage 1412.

As such, when the gas in the case 1300 is exhausted to the outside, the pressure of the gas may drop and thus the blockage membrane 1433 opened by the pressure part 1432 may again block the gas hole 1422, and the exhaust of the gas is stopped.

The pressure (atmospheric pressure) which blocks the gas hole 1422 may fall in the range of not less than 80 mbar but less than 160 mbar.

The cap 1400 according to an embodiment of the present invention is configured such that the gas generated via the chemical action of the electrolyte may be exhausted when its pressure is over a permissible level, thus suppressing evaporation of the electrolyte, thereby obviating supplementing of the electrolyte or increasing the supplement cycle of the electrolyte.

Figure 6:
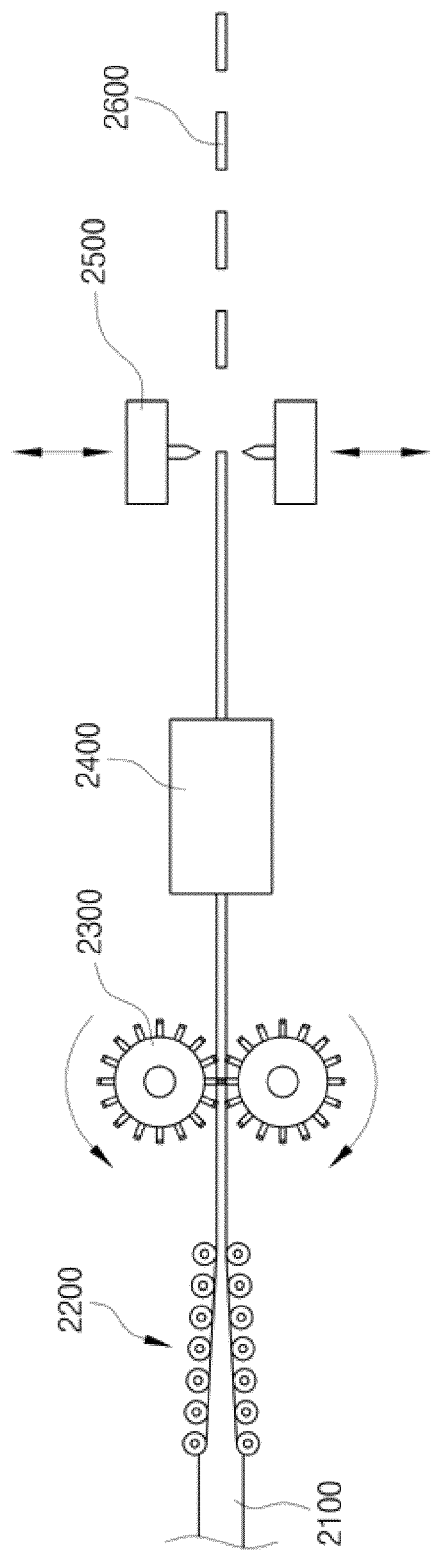
FIGS. 6 and 7 are views illustrating a system for manufacturing rolled expanded plates according to an embodiment of the present invention.
Figure 7:
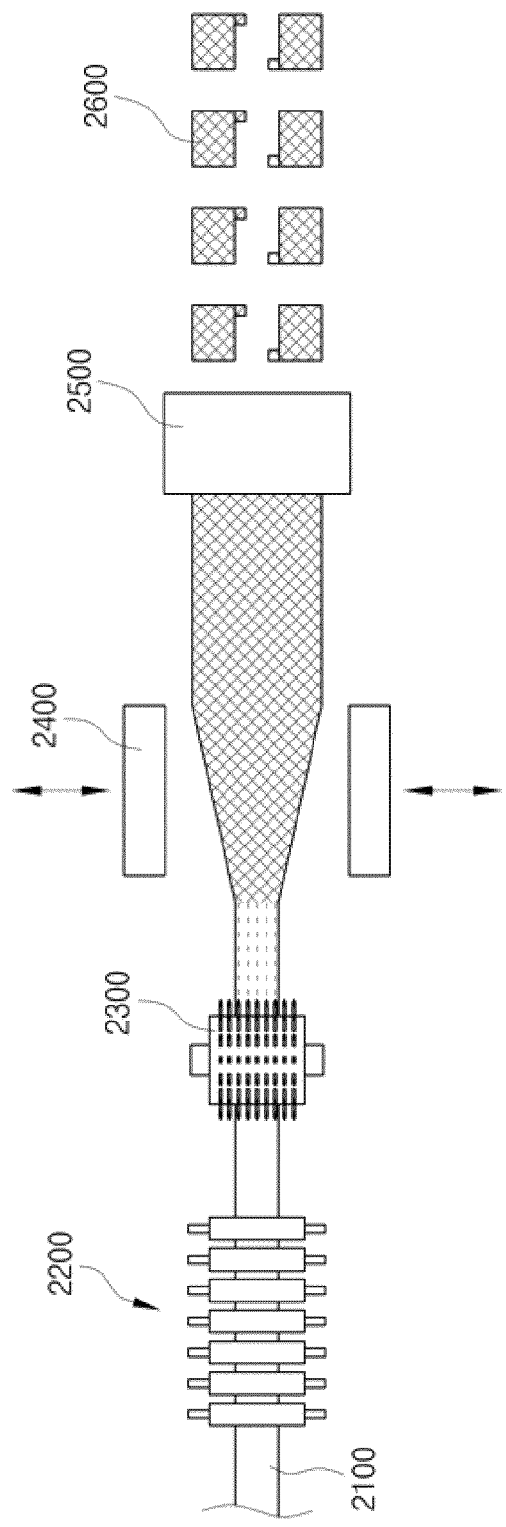

FIGS. 6 and 7 illustrate a system for manufacturing rolled expanded plates according to an embodiment of the present invention.

When specifically described below with reference to the appended drawings, a cast lead plate strip 2100 sequentially passes through a rolling part 2200 including 7 to 10 rollers, so that it is formed thinly to a thickness corresponding to ⅑ to 1/12 of the initial thickness.

The cast lead plate strip 2100 may have a thickness of 8 to 11 mm and a width of 90 to 110 mm.

A cut-forming part 2300 enables cuts having a size of 8 to 11 mm to be formed in series on the lead plate strip 2100 passed through the rolling part 2200 at up, down, left and right intervals of 5 to 10 mm An expansion part 2400 enables both sides of the lead plate strip 2100 passed through the cut-forming part 2300 to be drawn gradually in a width direction along the length of 10 to 20 m so that the width of the strip is increased by 2.5 to 4 times.

A cutting part 2500 enables the lead plate strip 2100 passed through the expansion part 2400 to be cut, thus mass producing rolled expanded plates 2600.

The system according to an embodiment of the present invention enables mass production to the extent that at least about 10 to 20 plates may be produced per second.

Figure 8:
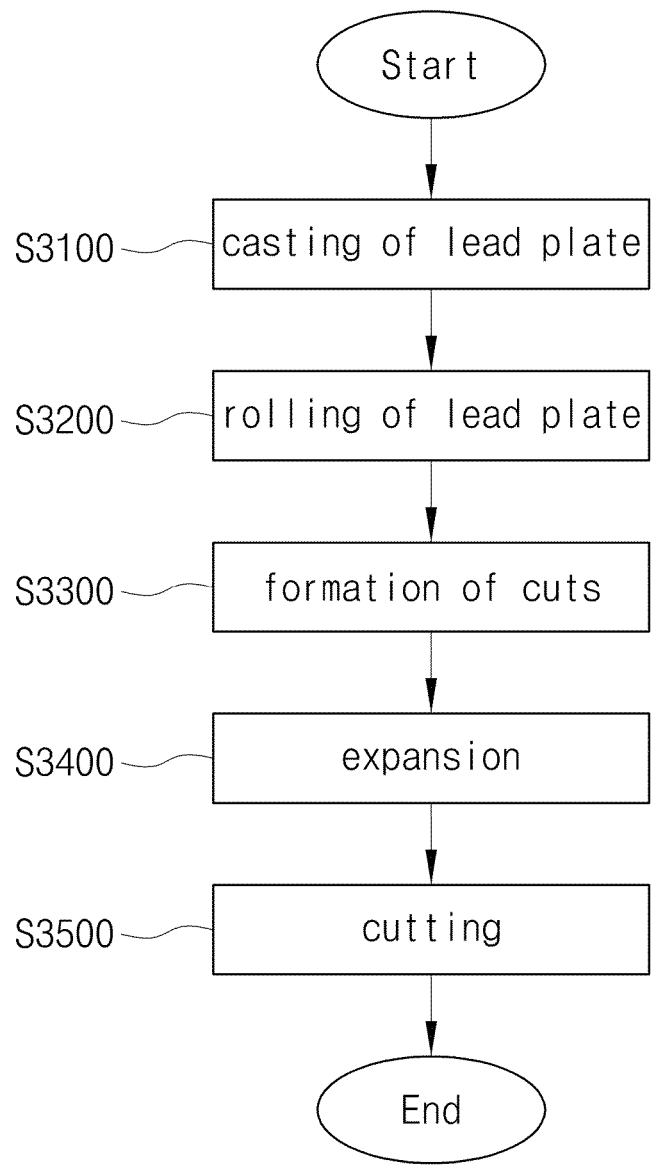
FIG. 8 is a flowchart illustrating a process of manufacturing rolled expanded plates according to an embodiment of the present invention.

FIG. 8 is a flowchart illustrating a process of manufacturing the rolled expanded plates according to an embodiment of the present invention.

When specifically described below with reference to the appended drawing, a lead plate strip having a thickness of 8 to 11 mm and a width of 90 to 110 mm is cast manufactured in a gravity manner via continuous casting using a lead solution by virtue of a cast mold (S3100), and the cast lead plate strip is sequentially subjected to 7 to 10 rolling operations using a rolling part having rollers so that it is thinly rolled to a thickness corresponding to ⅑ to 1/12 of the initial thickness (S3200).

Cuts having a size of 8 to 11 mm are then formed in series on the flat surface of the rolled lead plate strip at up, down, left and right intervals of 5 to 10 mm using a cut-forming part (S3300).

Both sides of the lead plate strip having the cuts in series are gradually drawn using an expansion part having a length of 10 to 20 m, so that the width of the strip is increased by 2.5 to 4 times (S3400).

The expanded lead plate strip is cut to a size adapted for the plates of the battery using a cutting part, thus manufacturing rolled expanded plates (S3500).

The plates manufactured according to an embodiment of the present invention are in a mesh shape and are comparatively thin, advantageously decreasing the weight of the lead battery.

Figure 9:
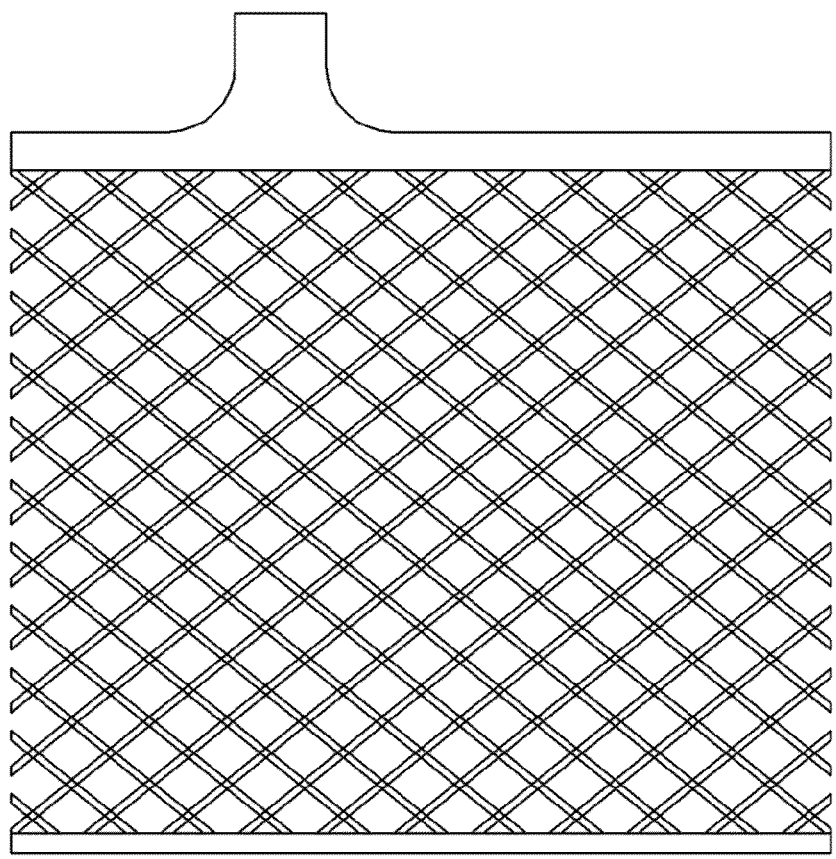
FIG. 9 is a view illustrating a rolled expanded plate according to an embodiment of the present invention.

FIG. 9 illustrates the rolled expanded plate manufactured according to an embodiment of the present invention.

When specifically described below, FIG. 9 shows the rolled expanded plate manufactured in such a manner that a lead plate strip is rolled thinly, processed to form cuts thereon, gradually drawn from both sides thereof in a width direction to expand the width thereof, and cut to a size adapted for a battery.

The plate is configured such that its middle portion is in a mesh shape, wherein the line intervals of the mesh are preferably adjusted so as to reduce the weight of the battery and facilitate the chemical reaction for storing electricity.

The surface of the plate may be coated with an active material to facilitate the chemical reaction, and then dried. The plates according to an embodiment of the present invention are configured such that grain boundaries of the metal structure of the rolled lead plate strip are layered densely via rolling.

Even when the rolled lead according to an embodiment of the present invention corrodes, it may thinly peel off like the skin of an onion, and thus the shape of the plates is not greatly changed due to corrosion and is maintained uniform, thus prolonging the expectable lifespan.

Hence, the lead battery using the rolled expanded plates according to an embodiment of the present invention may advantageously reduce the weight thereof while satisfying the extension of the expectable lifespan.

FIG. 10 is a graph illustrating the capacity of the battery using the plates according to the embodiment of the present invention, upon cycle testing at a DOD of 17.5%, and FIG. 11 is a graph illustrating the end voltage of the battery using the plates according to the embodiment of the present invention depending on the number of cycles, upon cycle testing at a DOD of 50%.

When specifically described below with reference to FIG. 10, the rectangular mark shows changes in capacity of a conventional liquid battery, and the circular mark shows changes in capacity of the battery according to the embodiment of the present invention.

The charge/discharge capacities of the lead batteries according to the embodiment of the present invention and the conventional technique are 70 A, and charge/discharge cycle testing is repeated at a DOD of 17.5%.

The end capacity of the battery indicates a capacity that has decreased to 50% or less of the rated output capacity. That is, the case where the output capacity is decreased to 35 A or less is determined to be an end capacity, and the testing time is represented in units of weeks.

In the drawing, the battery according to an embodiment of the present invention did not reach the end capacity even upon cycle testing for 24 weeks, but the conventional battery reached the end capacity in the $8^{th}$ week.

Thus, the lead battery according to an embodiment of the present invention may increase the expectable lifespan based on the capacity by at least 3 times.

When specifically described below with reference to FIG. 11, the circular mark shows changes in voltage (V) of the conventional liquid battery, and the rectangular mark shows changes in voltage of the battery according to the embodiment of the present invention.

The output voltages of the battery according to the embodiment of the present invention and the conventional lead battery are 12 V, and charge/discharge cycle testing is repeated at a DOD of 50%.

The end voltage of the battery indicates a voltage that has decreased to 10 V or less, and the number of cycles until the end voltage is detected is recorded.

In the drawing, the lead battery according to the embodiment of the present invention was subjected to 360 cycles before the end voltage was detected, but the conventional liquid battery was decreased to the end voltage upon about 130 cycles.

Therefore, the lead battery according to the embodiment of the present invention may lengthen the expectable lifespan based on the voltage by about 3 times.

The lead battery according to the embodiment of the present invention has an increased expectable lifespan, an improved charge rate, a reduced weight and thus an increased energy density, and may be applied to EVs or ISG vehicles to provide improved fuel efficiency.

Particularly, the lead battery according to an embodiment of the present invention facilitates the chemical reaction for storing electricity while supporting plates at a predetermined pressure by means of the AGM impregnated with an electrolyte. When such a battery is mounted to vehicles, it may efficiently endure conditions of extreme impact, vibration and tilt, and furthermore, the charge time is improved, thus maintaining reliability of output voltage.

Also, the weight of the lead battery may be decreased, thus reducing the weight of a vehicle and improving fuel efficiency while lowering the generation of pollution.

According to the present invention, expanded plates and AGM separators are used to reduce the weight of an automobile battery and to increase the lifespan thereof, thus decreasing the weight of a lead battery and prolonging the expectable lifespan thereof. Also, the leakage of gas can be suppressed by virtue of a rubber valve, the consumption of an electrolyte can be reduced, the plates can be prevented from corroding, and the charge rate of the battery can be increased, and thereby this battery is very useful in the field of automobile batteries and manufacturing plates thereof.

The invention claimed is:

1. An automobile lead battery, comprising:
    a plurality of anode plates for storing electricity in a chemically reactive state, the plurality of anode plates formed in a mesh shape by forming a plurality of cuts in series on a lead plate strip rolled to a uniform thickness and performing expansion processing;
    a plurality of cathode plates for storing electricity in a chemically reactive state, the plurality of cathode plates having a size identical to the anode plates and being in a mesh shape;
    an electrolyte;
    a plurality of separators disposed between the anode plates and the cathode plates so that the anode plates and the cathode plates are electrically insulated and mechanically separated, the plurality of separators formed by impregnating an absorbent glass mat (AGM) with the electrolyte, such that a chemical reaction for storing electricity is facilitated and an inner pressure of a cell is maintained constant;
    an upper case and a lower case, made of polypropylene and including a plurality of separate unit cells, each of the unit cells including the anode plates, the cathode plates, the separators, and the electrolyte; and
    a cap screw-coupled into a screw hole formed in each of the unit cells of the upper case so as to exhaust a gas generated during charge and discharge when pressure of the gas is over a predetermined level;
    wherein the cap comprises:
    an outer cap screw-coupled into the screw hole formed in each of the unit cells of the upper case, the outer cap comprising a fixed cavity having one closed end at a central portion thereof and an open end, an exhaust passage connected to the closed end of the fixed cavity so as to communicate with outside, and a fixed fin and a pressure protrusion, which protrude in a form of a cone at a center of the closed end of the fixed cavity;
    an inner cap inserted into the open end of the fixed cavity of the outer cap and fastened by a fastening lock, the inner cap including a gas hole having both open ends at a center thereof; and
    a valve provided between the outer cap and the inner cap, the valve comprising a hinge membrane of which a top and a bottom are fixed to one end of the inner cap and the fixed fin to close the fixed cavity, a pressure part connected to the hinge membrane and being in contact with the pressure protrusion to support a predetermined pressure and to block one open end of the gas hole, and a blockage membrane connected to the hinge membrane and the pressure part, wherein a bottom of the blockage membrane is either in contact with or spaced apart from the inner cap according to the inner pressure of the cell, and a top of the blockage membrane is exposed to the exhaust passage and is not supported by the inner cap so that one end of the gas hole is blocked and the blocked end of the gas hole is opened when the pressure part is not supported by a pressure more than the predetermined level.

2. The automobile lead battery of claim 1, wherein the cathode plates are of any one type selected from among types of rolled expanded plates, typical expanded plates, and cast expanded plates.

3. The automobile lead battery of claim 1, wherein the AGM is provided between the anode plates and the cathode plates, the AGM comprises a mat of glass fibers, and the AGM is impregnated with the electrolyte so that pressure is applied to the anode plates and the cathode plates and the AGM is brought into close contact with the anode plates and the cathode plates, and the plates are supported so as not to move while facilitating contact with the electrolyte.

4. The automobile lead battery of claim 2, wherein the cathode plates are the rolled expanded plates formed by continuously compressing a cast lead plate using a plurality of rollers to produce a lead plate strip having a uniform width and thickness, forming cuts in series thereon, gradually drawing both sides of the strip having the cuts in a width direction to expand the width, and cutting the strip to a predetermined size.

5. The automobile lead battery of claim 4, wherein the lead plate strip is cast having a thickness of 8 to 11 mm and a width of 90 to 110 mm;

the lead plate strip is compressed to be thinly rolled to a thickness corresponding to $1/9$ to $1/12$ of the initial thickness, the cuts are formed to a size of 8 to 11 mm at an interval of 5 to 10 mm, and the strip is expanded so that the width thereof is increased by 2.5 to 4 times.

6. The automobile lead battery of claim 1, wherein the predetermined pressure falls in a range of 80 to 160 mbar.

7. The automobile lead battery of claim 1, wherein the predetermined pressure falls in a range of 80 to 160 mbar.

* * * * *